United States Patent [19]
Morgan et al.

[11] Patent Number: 5,633,500
[45] Date of Patent: May 27, 1997

[54] SPLIT WINDOW SCATTER CORRECTION

[75] Inventors: Hugh T. Morgan, Highland Hts.; Gary G. Jarkewicz, Willoughby; Piotr J. Maniawski, Mayfield Hts.; Stephen D. Miller, Chagrin Falls, all of Ohio

[73] Assignee: Picker International, Inc., Highland Heights, Ohio

[21] Appl. No.: 561,936

[22] Filed: Nov. 22, 1995

[51] Int. Cl.$^6$ .................................................. G01T 1/161
[52] U.S. Cl. .................. 250/363.07; 250/363.09
[58] Field of Search .................. 250/363.07, 363.09; 364/413.24

[56]         References Cited

U.S. PATENT DOCUMENTS 5,371,672  12/1994  Motomura et al. .

OTHER PUBLICATIONS

Ogawa, et al.; "A Practical Method for Position–Dependent Compton–Scatter Correction in Single Photon Emission CT"; IEEE Transactions on Medical Imaging, vol. 10, No. 3, Sep. 1991.

King, et al.; "A Dual–Photopeak Window Method for Scatter Correction"; The Journal of Nuclear Medicine, vol. 33, No. 4, Apr. 1992.

Jaszczak, et al.; "Improved SPECT Quantification Using Compensation for Scatter Photons"; The Journal of Nuclear Medicine; vol. 25, No. 8, pp. 893–900, 1984.

Ichihara, et al.; "Compton Scatter Compensation Using the Triple–Energy Window Method for Single–and Dual–Isotope SPECT"; The Journal of Nuclear Medicine, vol. 34, No. 12, Dec. 1993.

Ljungberg, et al.; "Comparison of Four Scatter Correction Methods Using Monte Carlo Simulated Source Distributions"; The Journal of Nuclear Medicine, vol. 35, No. 1, Jan. 1994.

*Primary Examiner*—Michael J. Tokar
*Assistant Examiner*—Richard Hanig
*Attorney, Agent, or Firm*—Timothy B. Gurin; John J. Fry

[57]              ABSTRACT

A method of scatter correction for use with gamma cameras includes the steps of detecting and producing a first count value indicative of gamma radiation falling within a first energy range generally associated with a radionuclide photopeak. Gamma radiation falling within second and third energy ranges is also detected and a corresponding count produced. The second and third ranges are above and below the photopeak, respectively. The location of the second and third energy ranges is determined based on the energy resolution of the gamma camera such that a predetermined percentage of the radiation falling within the second and third ranges results from primary radiation. The second and third energy ranges may be located such that they are non-contiguous with the first energy range. Based on the count of radiation falling within the second and third ranges, the scatter radiation falling within the first energy range can be estimated, and the first count value corrected. The method is suitable for use with radionuclides having multiple closely spaced photopeaks as well as with multiple widely spaced photopeaks.

26 Claims, 5 Drawing Sheets

SPLIT WINDOW SCATTER CORRECTION

BACKGROUND

Nuclear or gamma cameras are often used to measure gamma radiation emitted by a body under examination. By measuring the energy level and the location of the gamma ray emissions, an image representative of the gamma radiation emitted from the body under examination can be created.

One application of nuclear or gamma cameras is in medical imaging, where one or more radionuclides are introduced into a region of interest within a patient. These radionuclides decay, thereby emitting gamma radiation characterized by photons having one or more characteristic energies. For example, Tc-99m emits photons having a photopeak located at approximately 140.5 keV.

In practice, however, the radiation spectrum resulting from the decay of a radionuclide is spread over a range of energies. Compton interactions with electrons in the gamma camera scintillation crystal and the body being imaged contribute to this spread. Photons which experience Compton interactions are deflected in angle and experience an energy loss compared to primary (i.e. non-scattered) photons, but can be detected along with primary photons, thereby resulting in spurious scatter counts at energy levels below a primary photopeak.

Variations in detected energy levels can also be caused by the energy resolution of the measurement equipment itself. Thus, depending on its energy resolution, a gamma camera exposed to monochromatic gamma radiation will produce output counts over a range of energies as illustrated in FIG. 1. One measure of a gamma camera's energy resolution is its full width half maximum ("FWHM"), which is defined as the full width of the energy distribution at half the maximum amplitude of the peak, assuming a monochromatice radiation input. The energy resolution and therefore the FWHM varies with camera manufacture and design as well as with photopeak energy. Thus, primary radiation which contributes to a useful image will as a practical matter be detected over a range of energies located in the region of a photopeak.

Various energy-based techniques for correcting for Compton scatter and measurement equipment variation have been attempted. One such technique utilizes a primary photopeak energy range along with a wide scatter energy range located below the primary photopeak in the Compton region. An estimate of the scatter counts falling within the photopeak energy range can then be generated based on the counts falling within the scatter energy range. It is, however, difficult to estimate the scatter counts using this method, one reason being that the scatter component falling within the photopeak energy range varies non-linearly with the scattering media. The relative width of the scatter energy range, together with the generally non-linear spatial distribution of counts within the scatter energy range, lead to further difficulties and concomitant errors in estimating the scatter component within the photopeak energy range.

In an alternate scheme, the photopeak region is divided into two abutting but non-overlapping energy ranges symmetrically located about the photopeak. A scatter fraction is estimated based on the count ratio between the upper and lower ranges. This method presents two major difficulties. First, it is difficult to determine a scatter relationship between the two ranges. Second, the method is sensitive to count spillover caused by energy window drifts that may occur during data acquisition. This method is thus relatively difficult to implement.

Yet another method is described in U.S. Pat. No. 5,371,672 to Motomura, et at. This method utilizes a plurality of energy ranges, the first being a photopeak range, while the second and third ranges are relatively narrow and abutting or overlapping each side of the photopeak range. In some cases, the upper or third range is omitted. According to this method, a separate event count is maintained for each energy range, each energy range thus being treated as a separate window for each of a multiplicity of x-y positions, thereby creating a separate image representation for each energy range. After being stored, the counts maintained within each window for a given x,y position are subsequently combined to estimate the scatter component. This technique has several disadvantages. By placing the scatter windows adjacent or overlapping with the main window, the second and third windows contain counts attributable to the main photopeak (i.e. non-scatter or primary counts), thereby reducing the accuracy of the scatter correction. This problem is exacerbated as the width of the main photopeak energy range is narrowed. The use of a separate window for each energy range also requires significant computer memory and real time processing.

Thus, it can be seen that a scatter correction technique which is accurate, simple to implement, and exhibits reduced memory requirements is needed.

SUMMARY

The present invention relates to an accurate, easily implemented, and memory efficient method and apparatus for correcting for scattering radiation received by a gamma camera.

The invention includes the steps of detecting gamma radiation and determining the energy level of the detected radiation. A count value indicative of the gamma radiation falling within a first energy range, which includes a radionuclide photopeak, is produced. A second count value, indicative of radiation falling within second and third energy ranges, is also produced. The second and third count energy ranges are below and above the radionuclide photopeak, respectively. Based on the second count value, a scatter count value indicative of scattering radiation falling within the first energy range can be calculated, and the first count value can be corrected to account for the calculated scattering radiation.

According to a more limited aspect of the present invention, the second and third energy ranges are separated in energy from (i.e. non-contiguous with) the first energy range.

According to another aspect of the invention, the upper limit of the second energy range is placed so that primary radiation (i.e. non-scattered photons) represents a predetermined percentage of the counts falling within the second range. Similarly, the lower limit of the third energy range may be placed so that primary radiation represents a predetermined percentage of the counts falling within the third range.

According to another aspect of the invention, the upper limit of the second range and the lower limit of the third range are placed based on a characteristic of the gamma camera, such as its energy resolution.

According to yet other aspects of the present invention, the first energy range may be placed symmetrically, or alternately asymmetrically, about the radionuclide photopeak.

Where the method is used with a radionuclide which has two or more closely spaced photopeaks, the upper limit of the second energy range may be located one full width half maximum below the lowest photopeak, and the lower limit of the third energy range may be located one full width half maximum above the highest photopeak.

According to another aspect of the invention, the method includes the steps of detecting the gamma radiation falling within a first energy range and producing a first count value representative of gamma radiation falling within the first energy range. Gamma radiation falling within a second energy range is also detected. The second energy range is determined based on a characteristic of the gamma camera. A count indicative of gamma radiation falling within the second energy range is also produced, and a scatter count representative of scattering radiation falling within the first energy range is then estimated. The first count value is then corrected based on the scatter count value.

According to a more limited aspect of the invention, the characteristic is the energy resolution of the gamma camera. According to another aspect of the invention, the first and second energy ranges are non-contiguous.

According to yet another aspect of the invention, the first energy rage is approximately symmetrical about the average energy level of more than one closely spaced photopeak.

According to another aspect of the present invention, the width of the first energy range is between 10% to 35% of the radionuclide photopeak energy.

According to another aspect of the present invention, the method includes the steps of detecting gamma radiation falling within a first energy range and producing a count value indicative of the gamma radiation falling within the first energy range. Gamma radiation falling within a second energy range is also detected, and a count value indicative of radiation falling within the second range is produced. The second energy range is selected to that a predetermined percentage of the counts falling within the second energy range is from primary photons from within the first energy rage. A count indicative of gamma radiation falling within the second energy range is also produced, and a scatter count representative of scattering radiation falling within the first energy range is then estimated. The first count value is then corrected based on the scatter count value.

DRAWINGS

DESCRIPTION

Figure 1:
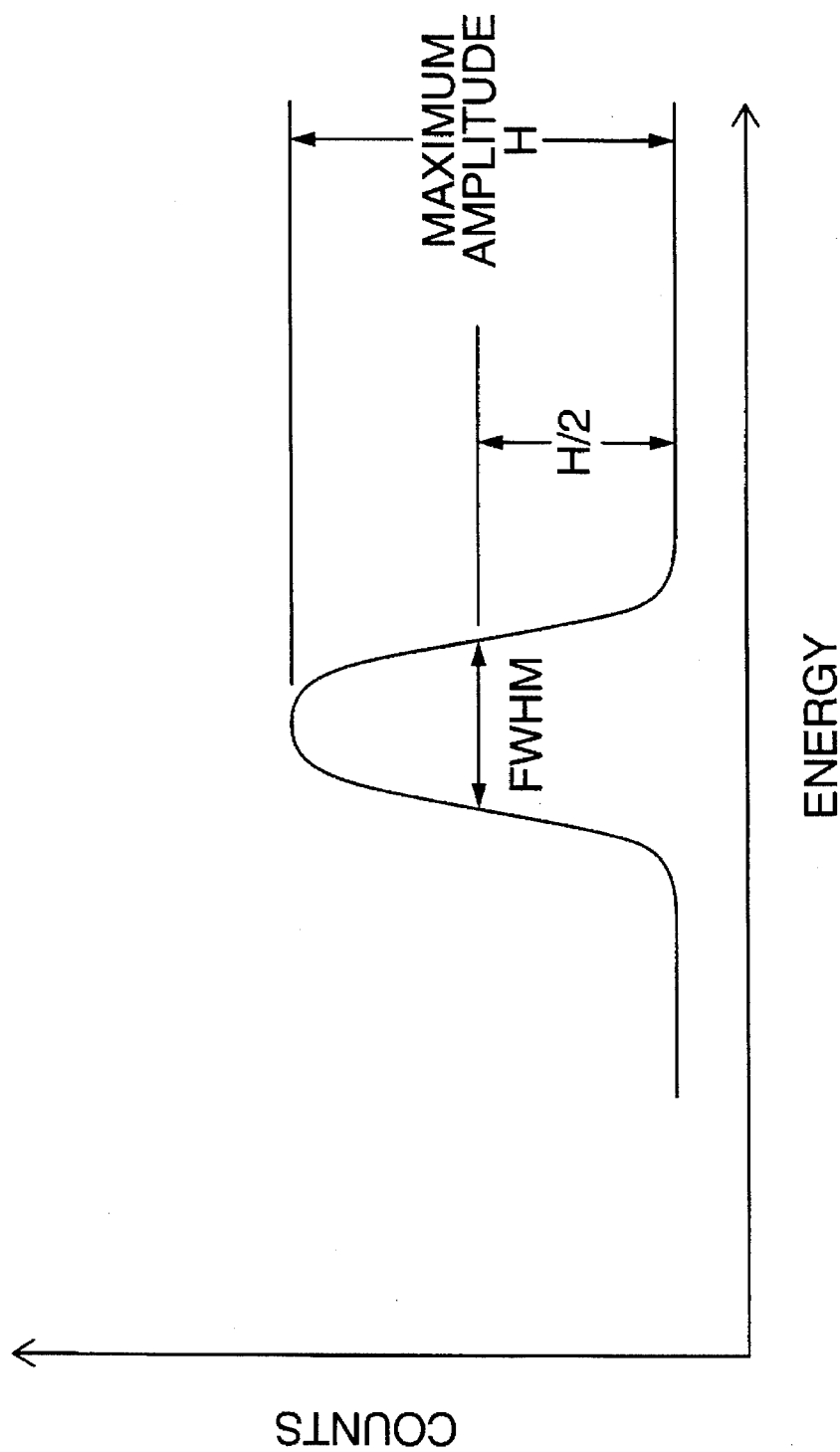
FIG. 1 depicts the response of a typical gamma camera to a monochromatic radiation input.
Figure 2:
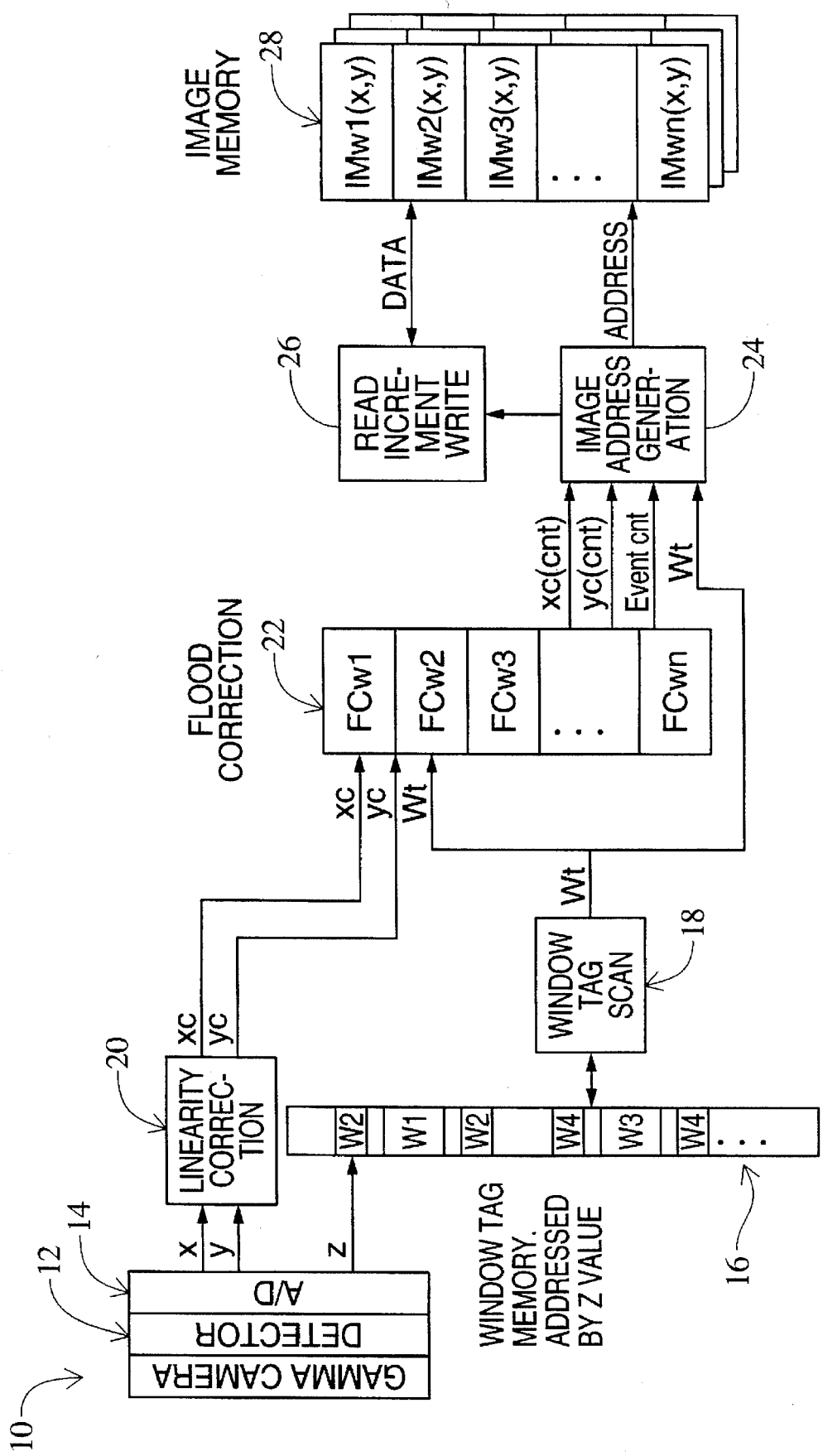
FIG. 2 is a block diagram of a gamma camera apparatus according to the present invention.

A gamma camera 10 detects radiation emitted from an object under examination, for example a patient injected with a radionuclide. With reference to FIG. 2, the gamma camera 10 comprises a detector means 12 which generally includes a collimator, a NaI(T1) crystal, a plurality of photomultiplier tubes, and processing electronics. The gamma camera 10 further includes an analog to digital converter means 14, which produces digital outputs indicative of the x,y position and the energy level z of photons detected by the gamma camera 10.

The energy level z, which corresponds to the energy of a detected photon, is used to classify the energy level z of a detected photon into one of a plurality of windows. A window detection circuit such as a window tag memory 16 defines a plurality of energy windows designated W1, W2, ... Wn, each corresponding to one or more energy ranges. For the sake of illustration, the energy ranges of the windows shown in the window tag memory 16 of FIG. 2 can be viewed as generally increasing from the top to the bottom of the window tag memory 16. For example, window W1 comprises a single energy range designated W1 while window W2 comprises two energy ranges, each of which ranges is designated in FIG. 2 as W2. A window can, of course, include more than two energy ranges. The window tag memory 16 contains a lookup table which is addressed based on the energy level z. Each address contains a value corresponding to an energy window. Addresses which do not correspond to one of the predefined windows contain a distinctive value.

The window tag memory 16 can be implemented by means of various alternative embodiments. For example, the window corresponding to a given energy level z can be determined using a routine resident in microprocessor firmware or by using one or more digital comparators. Similarly, the windows can be determined on an analog basis using one or more analog comparators.

A window tag scanner 18 receives the output of the window tag memory 16 and determines whether the detected photon fell within any of the predefined energy windows. If so, a window tag Wt is set to indicate the associated window. If not, the detected event is discarded and is not processed further.

The x,y coordinates of the detected event are corrected by linearity correction means 20 which remaps the coordinates in to corrected coordinates $x_c$, $y_c$ based on a predetermined calibration lookup table. Flood control means 22 corrects for location dependent non-uniformities in the sensitivity of detector 12 based on an a priori analysis of detector 12 characteristics. The flood correction means 22 may ignore an event, pass the event, or pass the event and add an additional event. If an event is added, the new event is added at a random location in the vicinity of the passed event. For each event passed by the flood correction means 22, corresponding position coordinates $x_c(cnt)$, $y_c(cnt)$ and an event count E(cnt) are generated.

The position coordinates and the corresponding window tag are used by an image address generation means 24 which generates a unique memory address based on the position and energy level of the event. In response to an event, a memory increment means 26 reads data from the corresponding address in the image memory 28, increments the data to reflect the new event count, and stores the incremented data in the corresponding address.

The image memory 28 is a conventional memory means such as a random access memory. The memory 28 contains a plurality of event counts for each of the x,y positions of the gamma camera 10. Thus, each x,y position has associated with it a plurality of memory locations, each representative of an energy window. Considerable memory savings is achieved by combining a plurality of energy ranges into one window. Thus, for example, if a system has three energy ranges of interest (i.e. a main photopeak energy range and two scatter correction energy ranges), memory requirements are reduced by 33% by combining the counts associated with the two scatter correction ranges into one window.

It is not necessary to combine the counts associated with multiple energy ranges into one window. Thus, a count of events falling within each of the individual energy ranges can be stored in a different memory location. Such a configuration provides the added benefit of permitting scaling of the counts within each of the energy ranges at the expense of requiring additional memory.

A conventional computer means such as a microprocessor or CPU processes the data stored in the image memory 28 to form an image representative of the gamma radiation emitted by the object under examination. The image is displayed on suitable display means such as a monitor or CRT.

Figure 3:
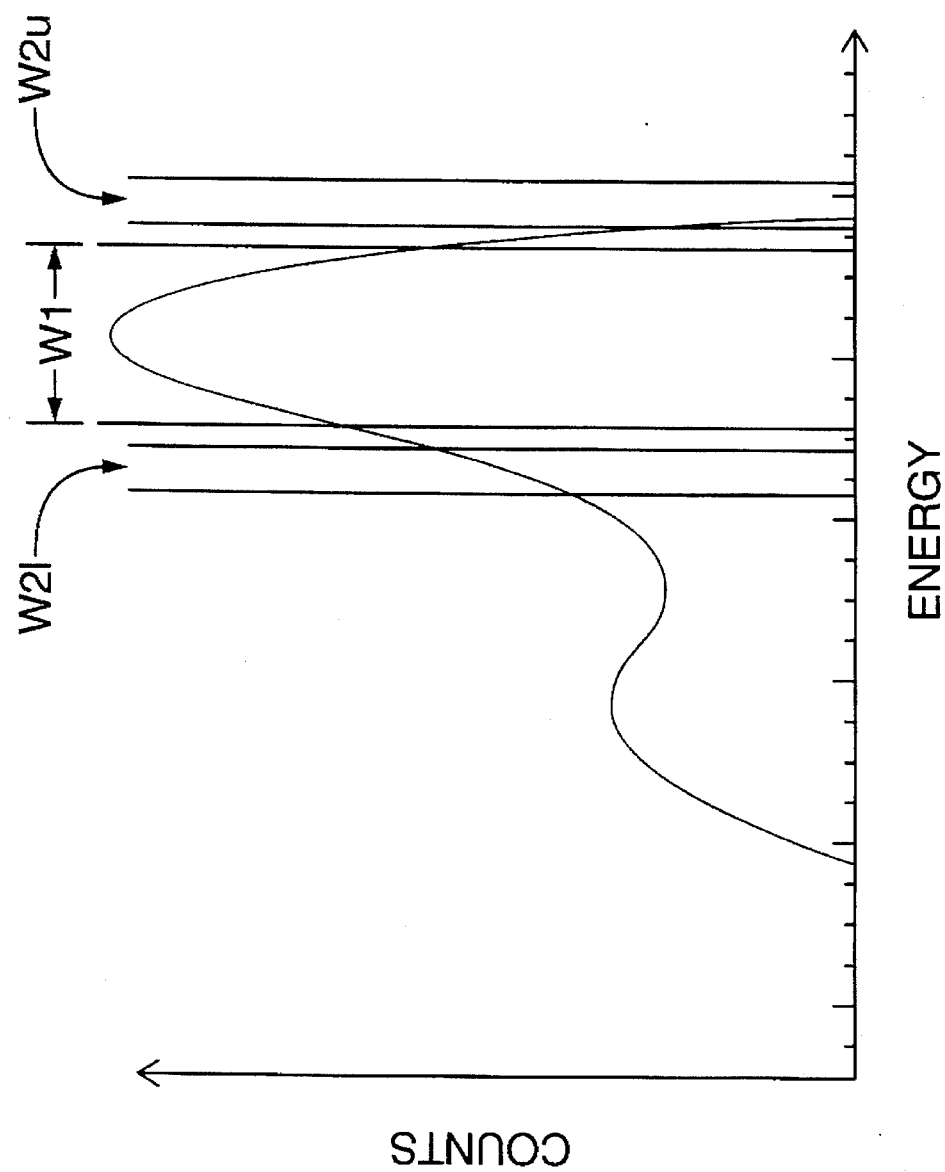
FIG. 3 shows the energy distribution of the gamma radiation and window placement for a radionuclide having a single photopeak.

FIG. 3 shows a typical energy distribution of the gamma radiation emitted from a radionuclide having a single photopeak, such as Tc-99m. First energy range W1 defines an energy range which is approximately symmetrical about the radionuclide photopeak, for example 140.5 keV for Tc-99m. Increasing the width of the first energy range to include more of the region surrounding the photopeak increases the number of counts falling within the first energy range, thereby reducing imaging time but increasing the number of counts attributable to scattering radiation. Reducing the width of the first energy range increases the likelihood that the count value is comprised primarily of primary photons at the expense of discarding primary photons which would otherwise contribute to the image.

Second and third energy ranges $W2_l$ and $W2_u$ are located below and above the photopeak, respectively. Placement of the second and third energy ranges is a function of two competing concerns. First, it is desirable to place these energy ranges at a sufficient distance from the photopeak so that primary photons comprise a relatively small component of the radiation falling within the second and third ranges. Stated another way, increasing the distance between the second and third energy ranges and the photopeak increases the likelihood that the count value representing radiation falling within the second and third ranges be comprised of scattering as opposed to primary radiation. At the same time, it is desirable to place the second and third energy ranges close to the photopeak so that the magnitude and spatial distribution of the counts within the second and third ranges more closely approximate those in the region of the photopeak. Stated another way, placing the second and third energy ranges as close as possible to the photopeak minimizes the distance over which an interpolation must be conducted, thereby increasing its accuracy.

The first energy range is approximately symmetrical about the photopeak and has a width from 10% to 35% of the photopeak energy. The upper limit of the second energy range is placed one full width half maximum in keV ("FWHM(keV)") below the photopeak centerline. The lower limit of the third energy range is placed one FWHM (keV) above the photopeak centerline. This placement of the second and third energy ranges is such that about 1% of the counts falling within the second energy range and 1% of the counts falling within the third energy range are from primary (i.e. unscattered) photons, assuming a gaussian distribution of measured primary photon energies. Where the distribution is other than gaussian or where it is otherwise desired that the primary counts falling within a the second or third ranges comprise a particular percentage of the total counts within each range, the second and third windows can be placed accordingly. The combined width of the second and third energy ranges is less than or equal to 15% of the photopeak centerline energy. The widths of the second and third ranges need not be equal. Experimental data indicates that acceptable performance is achieved with the second and third energy ranges each having a width of 4 keV, although wider energy ranges may be preferable for radionuclides having a higher photopeak energy than Tc-99m.

FWHM(keV) is defined as the width of the photopeak in keV at half the maximum amplitude of the peak. The energy resolution is defined by:

$$\text{Percent Energy Resolution} = FWHM(\text{keV})/\text{Photopeak Energy(keV)} \times 100 \tag{1}$$

For Tc-99m, satisfactory performance can be achieved where the first energy range is centered at approximately 140.5 keV and has a width of approximately 21 keV, or 15% of the photopeak centerline. Assuming a gamma camera 10 with an energy resolution of 10% (i.e. a FWHM of 14 keV), the upper limit of the second energy range is approximately 126.5 keV; and the lower limit of the third energy range is approximately 154.5 keV. Acceptable performance may be obtained with the third energy range deleted. It will be appreciated that, in this embodiment of the invention, the first, second, and third energy ranges are not contiguous. Stated another way, the first, second, and third energy ranges are separated in energy from one another.

Alternatively, the first energy range can be shifted upward so that it is no longer symmetrical about the radionuclide photopeak. Inasmuch as the scatter counts are most prevalent below the photopeak, shifting the first energy range upward has the advantage of reducing the scatter counts falling within the first energy range.

Figure 4:
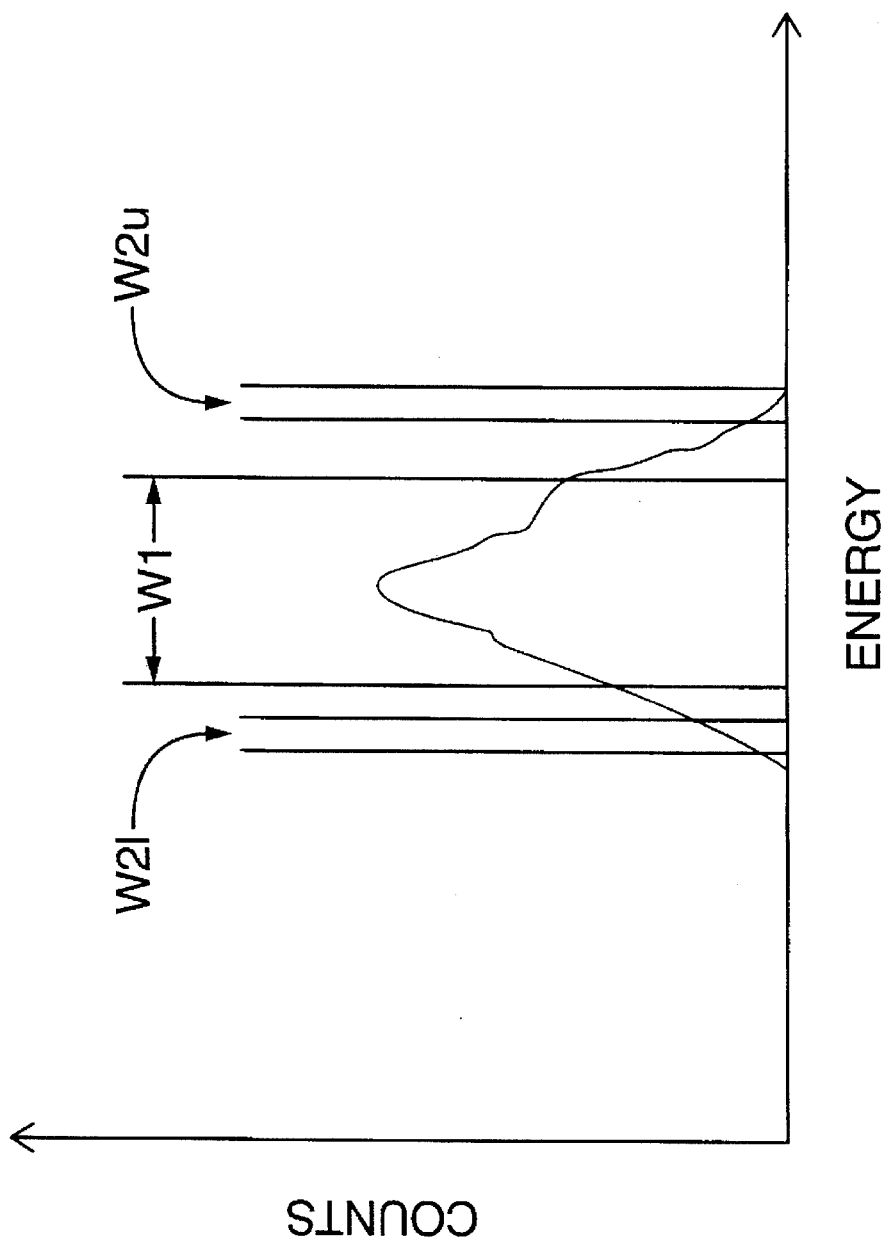
FIG. 4 shows the energy distribution of the gamma radiation and window placement for a radionuclide having multiple photopeaks within a relatively narrow energy range.

The invention is equally applicable to other radionuclides. With reference to FIG. 4, certain radionuclides have a plurality of photopeaks falling within a relatively narrow spectrum compared to the energy resolution of the gamma camera such that discrimination between photons emitted at each of the photopeaks is not feasible. In such a situation, the first energy range is centered about the approximate average of the the closely spaced photopeaks. The edges of the second and third energy ranges are located one FWHM from the lower and upper photopeak, respectively. Alternatively, the first energy range can be shifted upward so that it is no longer symmetrical about the radionuclide photopeak.

For example, Tl-201 has photopeaks at 68.9, 70.8, 80.3, 135.3, and 167.4 keV. Focusing on the three lowest photopeaks, satisfactory performance can be acheived where a first energy range is centered at approximately 73.0 keV and has a width of 21.9 kev to 25.55 keV, or 30% to 35% of the average energy. Assuming a gamma camera with an energy resolution of 14% at 68.9 keV and 13% at 80.3 keV, the upper limit of the second energy range is approximately 59.0 keV, and the lower limit of the third energy range is approximately 90.9 keV. The second and third ranges each have a width of 4 keV. An additional set of energy ranges and corresponding windows may be placed about the 167.4 keV photopeak as described above.

The scatter count representative of scattering radiation falling within the first energy range is estimated for each x,y position using the following relationship:

$$C_{scat}(x,y) = (C_{split}(x,y)/W_{split}) * W_{photo} * k \tag{2}$$

where $C_{split}$ is a count value representative of gamma radiation falling within the second and third energy ranges;

$W_{split}$ is the combined width of the second and third energy ranges in keV; $W_{photo}$ is the width of the first energy range in keV; and k is a an experimentally derived isotope scatter proportionality scale factor which can be used to approximate a nonlinear scatter function within the first energy range. Assuming linearity of the scatter function, k=1.0.

A corrected count value, which corrects for the estimated scattering radiation falling within the first energy range, is determined for each x,y position based on the following relationship:

$$C_{prim}(x,y) = C_{total}(x,y) - C_{scat}(x,y) \qquad (3)$$

where $C_{total}$ is the total count value indicative of gamma radiation falling within the first energy range, and $C_{prim}$ is the estimated count value resulting from primary radiation.

In operation, a photon emitted by a radionuclide is detected by the gamma camera 10. The x,y coordinates and the energy level z of the event are converted to digital form by the analog to digital converter 14. Based on the energy level z of the event, the window tag memory 16 produces an output $W_t$ indicative of a corresponding energy window. Thus, a photon having an energy falling within the first or primary photopeak energy range results in a window tag output indicative of window W1. A photon falling within the second or third energy ranges produces a window tag output indicative of window W2. If the energy level z of the event does not fall within one of the predefined energy ranges comprising a window, the window tag memory produces a unique output. The window tag scanner 18 receives the output of the window tag memory 16. If the event does not fall within a predefined window, further processing of the event is suspended.

The linearity correction means 20 and the flood correction memory means 22 compensate for nonlinearities and nonuniformities in the detector. The image address generation means 24 generates a memory address based on the corrected position $x_c, y_c$ and the window tag $W_t$. The corresponding location in the image memory means 28 is then incremented by the memory increment means 26. Accordingly, for each x,y position, a plurality of counts is maintained, each corresponding to one of the energy windows W1, W2, ... Wn.

For a radionuclide having a single photopeak, the estimated scatter count $C_{scat}(x,y)$ and corrected count value $C_{prim}(x,y)$ are then calculated based on equations (2) and (3) above, where $C_{split}(x,y)$ is the event count corresponding to window W2, $W_{split}$ is the width of the energy ranges which comprise W2, $W_{photo}$ is the width of W1, and $C_{total}$ is event count corresponding to window W1. The corrected count value $C_{prim}(x,y)$ is thus representative of the desired gamma radiation signal with the scatter components eliminated. Corrected count value $C_{prim}(x,y)$ is then used to generate a display of the desired image. The calculation and display generation functions are performed by a conventional computer means such as a microprocessor or CPU.

Figure 5:
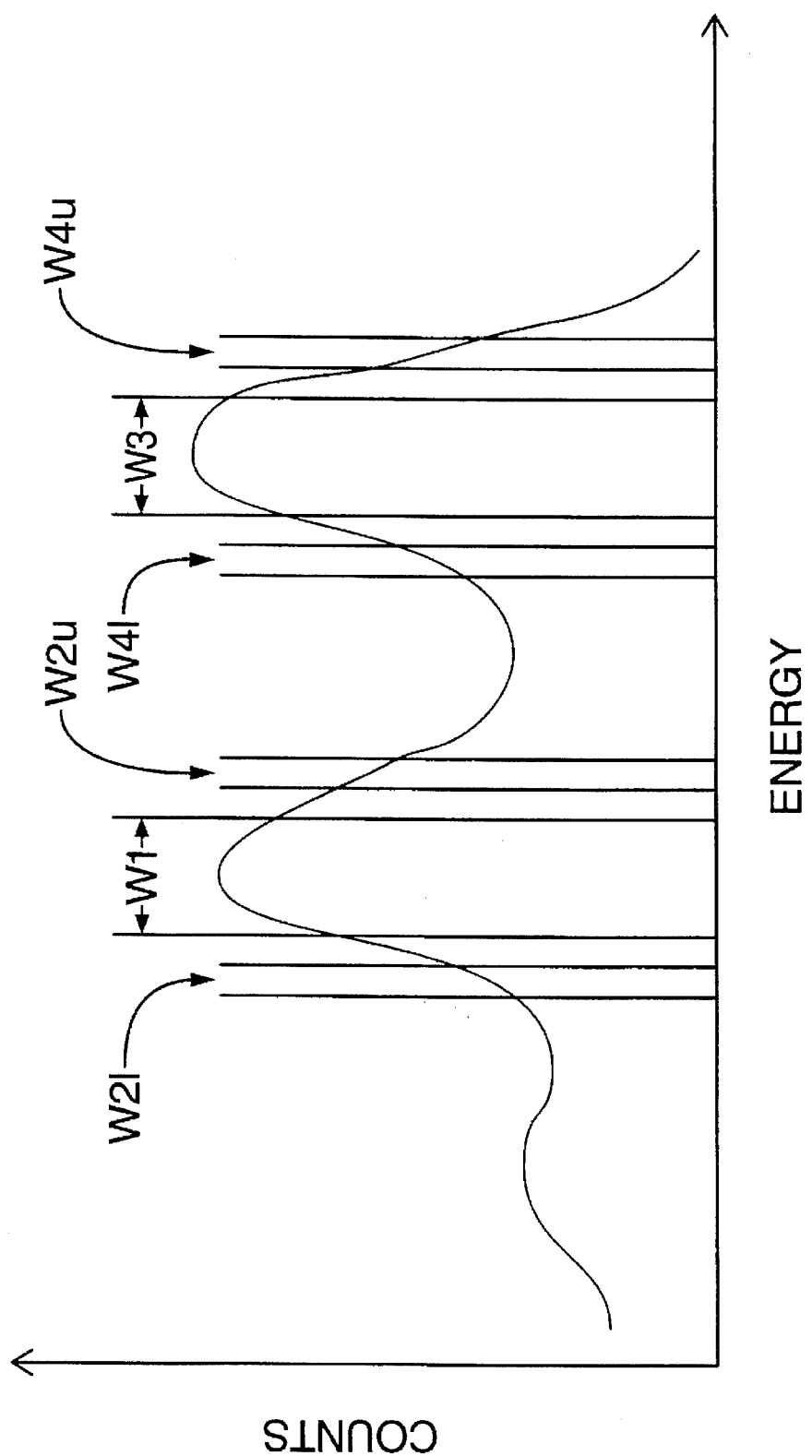
FIG. 5 shows the energy distribution of the gamma radiation and window placement for a radionuclide having multiple photopeaks spread over a relatively wide energy range.

The invention is equally applicable the detection of radiation having multiple photopeaks which are widely separated in energy compared to the energy resolution of the gamma camera, for example applications involving a radionuclides having multiple widely spaced photopeaks, multiple radionuclides, or simultaneous transmission-emission measurements using more than one radionuclide. The energy distribution and window placement for such a situation is illustrated in FIG. 5. The first through third energy ranges and the first and second windows are implemented as in the single photopeak case, although the third energy range is preferably not deleted. Window W3 is analogous to window W1 and corresponds to a fourth energy range generally surrounding the second photopeak. Similarly, window W4 is analogous to window W2 and comprises fifth and sixth energy ranges below and above the second photopeak, respectively. Acceptable performance may be obtained with the sixth energy range deleted. Separate estimated scatter count $C_{scat}(x,y)$ and corrected count $C_{prim}(x,y)$ values are calculated for each photopeak based on windows W1 and W2, and W3 and W4, respectively. The separate corrected count values $C_{scat}(x,y)$ are subsequently combined to generate an image. The invention can also be extended for use with radionuclides or combinations of radionuclides having a three or more photopeaks by adding additional analogous energy windows.

The above invention has been described with reference to the preferred embodiments. Obvious modifications and combinations will occur to others upon reading and understanding the preceding description. It is intended that the invention be construed as including all such modifications, combinations, and alterations insofar as they come within the scope of the appended claims or the equivalents thereof.

What is claimed is:

1. A method of scatter correction for use with a gamma camera, the method comprising the steps of:

detecting gamma radiation falling within a first energy range;

producing a first count value indicative of the gamma radiation falling within the first energy range;

detecting gamma radiation falling within a second energy range, the second energy range being below the first energy range and separated in energy therefrom;

detecting gamma radiation falling within a third energy range, the third energy range being above the first energy range and separated in energy therefrom;

producing a second count value representative of the gamma radiation falling within the second and third energy ranges;

estimating, based on the second count value, a scatter count value representative of scattering radiation falling within the first energy range; and correcting the first count value based on the scatter count value.

2. The method of claim 1 wherein the first energy range includes a radionuclide photopeak and the upper limit of the second energy range is placed one FWHM(keV) below the photopeak.

3. The method of claim 1 wherein
   the first energy range includes a radionuclide photopeak;
   the upper limit of the second energy range is placed such that a predetermined percentage of the counts falling within the second energy range is from primary photons; and
   the lower limit of the third energy range is placed such that a predetermined percentage of counts falling within the third energy range is from primary photons.

4. The method of claim 3 wherein the predetermined percentage is 1%.

5. The method of claim 1 wherein the first energy range is approximately symmetrical about a radionuclide photopeak.

6. The method of claim 1 wherein the first energy range includes more than one closely spaced photopeak and the upper limit of the second energy range is located one FWHM(keV) below the the lowest photopeak.

7. A method of scatter correction for use with a gamma camera, the method comprising the steps of:

detecting gamma radiation;

determining the energy level of the detected radiation;

producing a first count value indicative of the gamma radiation falling within a first energy range, the first energy range including a radionuclide photopeak;

producing only a second count value indicative of the gamma radiation falling within second and third non-contiguous energy ranges;

estimating, based on the second count value, a scatter count value representative of scattering radiation falling within the first energy range; and correcting the first count value based on the scatter count value.

8. The method of claim 7 wherein the upper limit of the second energy range is separated in energy from the lower limit of the first energy range; and the lower limit of the third energy range is separated in energy from the upper limit of the first energy range.

9. The method of claim 7 further comprising the steps of determining the energy resolution of the gamma camera;

establishing, based on the energy resolution, the second and third energy ranges;

wherein the upper limit of the second energy range is placed such that a predetermined percentage of the counts falling within the second energy range are from primary photons; and the lower limit of the third energy range is placed such that a predetermined percentage of counts falling within the third energy range are from primary photons.

10. The method of claim 7 wherein upper limit of the second range is one FWHM(keV) below the photopeak.

11. The method of claim 7 wherein the first range is asymmetrical about a radionuclide photopeak.

12. The method of claim 7 wherein the upper limit of the second range and the lower limit of the third range are selected based on the energy resolution of the gamma camera.

13. A method of scatter correction for use with a gamma camera, the method comprising the steps of:

detecting gamma radiation falling within a first energy range;

producing a first count value indicative of the gamma radiation falling within the first energy range;

detecting gamma radiation falling within a second energy range, the second energy range being determined based on the energy resolution of the gamma camera;

producing a count indicative of radiation falling within the second energy range;

estimating, based on the count of radiation falling within the second energy range, a scatter count representative of scattering radiation falling within the first energy range; and correcting the first count value based on the scatter count value.

14. The method of claim 13 wherein the first energy range comprises a photopeak, the second energy range is below the first energy range, and the upper limit of the second energy range is one gamma camera FWHM(keV) below the photopeak.

15. The method of claim 13 wherein the first and second energy ranges are non-contiguous.

16. The method of claim 13 wherein the first energy range is approximately symmetrical about the average energy level of more than one closely spaced photopeak.

17. The method of claim 13 wherein the width of the first energy range is between approximately 10% to 35% of a radionuclide photopeak.

18. The method of claim 13 wherein further comprising the steps of detecting gamma radiation falling within a third energy range, the third energy range being above the first energy range at a location determined based on the energy resolution of the gamma camera; and producing a third count value indicative of gamma radiation falling within the third energy range;

wherein the second energy range is below the first energy range and the step of estimating is based on the count of radiation falling within the second and third energy ranges.

19. A method of scatter correction for use with a gamma camera, the method comprising the steps of:

detecting gamma radiation falling within a first energy range;

producing a first count value indicative of the gamma radiation falling within the first energy range;

detecting gamma radiation falling within a second energy range;

producing a count indicative of radiation falling within the second energy range, the second energy range being determined such that a predetermined percentage of counts falling within the second energy range is from primary photons from within the first range;

estimating, based on the count of radiation falling within at least the second energy range, a scatter count representative of scattering radiation falling within the first energy range; and correcting the first count value based on the scatter count value.

20. The method of claim 19 wherein the width of the second energy range is narrower than the width of the first energy range and the first and second energy ranges are non-contiguous.

21. The method of claim 20 wherein the predetermined percentage is 1%.

22. A gamma camera comprising:

means for detecting gamma radiation falling within a first energy range;

means for producing a first count value indicative of the gamma radiation falling within the first energy range;

means for detecting gamma radiation falling within a second energy range, the second energy range being determined based on the energy resolution of the gamma camera and separated in energy from the first energy range;

means for producing a count indicative of radiation falling within the second energy range;

means for estimating, based on the count of radiation falling within the second energy range, a scatter count representative of scattering radiation falling within the first energy range; and means for correcting the first count value based on the scatter count value.

23. The gamma camera of claim 22 wherein the first energy range is approximately symmetrical about the average energy level of more than one closely spaced photopeak.

24. The gamma camera of claim 22 wherein the width of the first energy range is between approximately 10% to 35% of a radionuclide photopeak.

25. The gamma camera of claim 22 further comprising means for detecting gamma radiation falling within a third energy range, the third energy range being above the first energy range; and means for producing a third count value indicative of gamma radiation falling within the third energy range, the third energy range being determined based on the energy resolution of the gamma camera;

wherein the second energy range is below the first energy range and the means for estimating uses the count of radiation falling within the second and third energy ranges.

26. A gamma camera comprising:

means for detecting gamma radiation;

means for determining the energy level of the detected radiation;

producing a first count value indicative of the gamma radiation falling with a first energy range which includes a radionuclide photopeak;

means for producing only a second count value indicative of the gamma radiation falling within second and third non-contiguous energy ranges being below and above a radionuclide photopeak, respectively;

means for estimating, based on the second count value, a scatter count value representative of scattering radiation falling within the first energy range; and means for correcting the first count value based on the scatter count value.

* * * * *